INVENTOR
John C. Gambale and
Warren J. Schmidt

Sept. 19, 1967  J. C. GAMBALE ETAL  3,343,084
HALL GENERATOR SYSTEM USEFUL AS INTEGRATING METER, DEMAND
METER AND INVERSE CURRENT RELAY
Filed June 20, 1963  4 Sheets-Sheet 2

United States Patent Office 3,343,084
Patented Sept. 19, 1967

3,343,084
HALL GENERATOR SYSTEM USEFUL AS INTEGRATING METER, DEMAND METER AND INVERSE CURRENT RELAY
John C. Gambale, Livingston, and Warren J. Schmidt, Upper Montclair, N.J., assignors to Westinghouse Electric Corporation, Pittsburgh, Pa., a corporation of Pennsylvania
Filed June 20, 1963, Ser. No. 289,194
8 Claims. (Cl. 324—103)

This invention relates to static electrical devices adapted to replace those normally employing the induction disc principle, and more particularly to electrical meters and relays which utilize saturable core transformers as circuit elements.

As an overall object, the present invention seeks to provide static devices utilizing a saturable core transformer responsive to a variable of an electrical circuit for performing functions previously performed by electrical devices utilizing an induction disc, the saturable core transformer acting in accordance with the invention to integrate with respect to time quantities representing variables of the circuit.

Another object of the invention is to provide a static meter (e.g. a watt-hour meter) employing a Hall generator and a saturable core transformer, the Hall generator serving to produce a signal which varies in magnitude in proportion to a function of product of the voltage and current (e.g., power) of an electrical circuit, and the saturable core transformer acting in response to said signal in producing an output pulse each time the integral of the function with respect to time equals a predetermined amount. Thus, by counting the output pulses from the saturable core transformer, the total energy delivered through the circuit can be determined. As will be seen, the meter of the invention can be used either single-phase or three-phase alternating current systems, depending upon requirements; and it can also be used in direct current circuits.

Another object of the invention is to provide a static demand meter also employing a Hall generator and a saturable core transformer. The Hall generator in this case acts, as in the case of the watt-hour meter, to produce a signal which varies in proportion to a function of the product of the current and voltage of an electrical circuit. This signal is applied to one winding of a saturable core transformer; but the transformer, unlike that of the watt-hour meter, does not saturate to produce an output pulse in response to fixed amounts of energy. Rather, the transformer core is made to saturate at fixed time intervals and the magnitude or amplitude of output pulses measured, this magnitude being a measure of the demand for the aforesaid fixed time interval.

A further object of the invention resides in the provision of a volt-ampere-hour meter also employing a Hall generator and a saturable core transformer in somewhat the same manner as the watt-hour meter described above. In this case, however, the line voltage of an alternating current circuit is initially rectified before being applied to the Hall generator with the result that the output signal from the Hall generator varies in proportion to the product of the line current and the RMS value of line voltage. The saturable core transformer integrates this product with respect to time and produces output pulses each of which represents a fixed amount of the RMS value of line voltage and current.

As another object, the invention provides a static inverse-time overcurrent relay which is set to trip in a time inversely proportional to the current over a predetermined safe value of current. This is accomplished by passing the line current through a resistance and by applying the voltage appearing across this resistance to one winding of a saturable core transformer which will saturate in response to an overcurrent condition to produce an output pulse which trips a relay. The saturable core transformer is such as to automatically become reset each time it is saturated preparatory to a succeeding trip function.

A further object of the invention is to provide a relay of the general type described above employing a saturable core transformer which is set to trip in a time inversely proportional to the square of the current over a predetermined safe value of current.

Finally, still another object of the invention is to provide a relay employing a saturable core transformer which is set to trip in a time inversely proportional to the cube of the current over a predetermined safe value of current.

The above and other objects and features of the invention will become apparent from the following detailed description taken in connection with the accompanying drawings which form a part of this specification, and in which.

Figure 1:
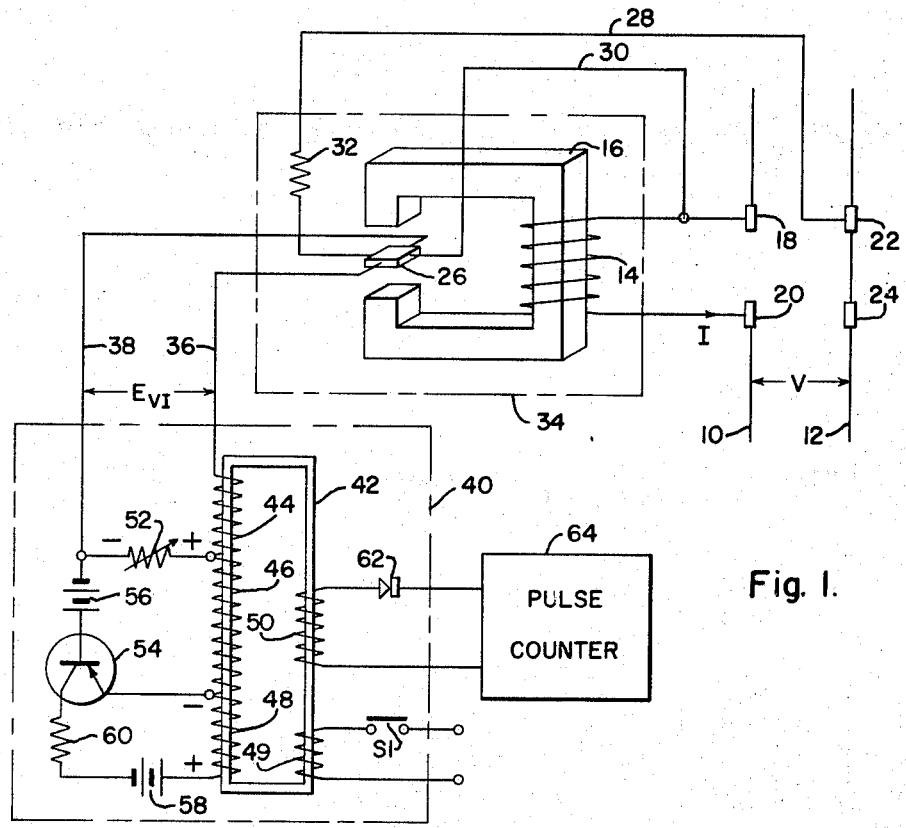
FIG. 1 is a schematic circuit diagram of a static watt-hour meter embodying the invention as applied to a single-phase alternating current circuit.

Referring now to the drawings, and particularly to FIG. 1, the numerals 10 and 12 designate the two leads or conductors of an alternating current circuit.

Contact jaws 18, 20, 22 and 24 are associated in a conventional manner with the conductors 10 and 12 for reception of a detachable watt-hour meter. This meter embodies a number of components which now will be described.

Conductor 10 is connected in series with a winding 14 inductively coupled to a laminated magnetically permeable core 16, the winding 14 being connected to the conductor 10 through the contact jaws 18 and 20. Conductor 12 includes the contact jaws 22 and 24 as shown. At 26 is a Hall plate disposed in a narrow air gap of the laminated magnetically permeable core 16. The coil 14 is energized in proportion to the current in the alternating current circuit 10, 12 for producing an alternating field through the Hall plate 26 at right angles to its place. A current proportional to the voltage of the alternating current circuit is passed through the plate 26 edgewise through leads 28 and 30, disposed centrally of the upper and lower edges of the plate 26 and connected across the conductors 10 and 12 through a dropping resistance 32 as shown.

The arrangement just described is known as a Hall generator and is shown in FIG. 1 enclosed by the broken line 34. Such a Hall generator will produce a Hall voltage across the plate 26 along an axis which is at right angles to both the magnetic field therethrough and the axis of the input current through leads 28 and 30. By passing the load current I of the alternating current circuit through the winding 14, a magnetic field is produced in the air gap of core 16 proportional to the load current. Furthermore, by applying the line voltage V across dropping resistor 32 and the plate 26, a current flows through the plate 26 proportional to voltage V. The result is a potential $E_{VI}$ across leads 36 and 38 proportional to the instantaneous product of the current through resistor 32 and the flux across the air gap of core 16, thus making it proportional to a function of the instantaneous product of line voltage V and load current I, which instantaneous power is usually expressed in watts. If the circuit containing the resistor 32 is essentially resistive, as in this present case, the current in the circuit is essentially in phase with the line voltage V. The summation of the instantaneous watts over a period of time is energy usually expressed in watt-hours. That is:

$$W = \int VI \, dt$$

where:

$W$ = watt-hours
$V$ = line voltage
$I$ = load current and
$t$ = time

It will be apparent from the foregoing that in order to obtain a measure of energy in watt-hours, it is necessary to integrate the potential $E_{VI}$ appearing between the output terminals 36 and 38 of the Hall generator 34. For this purpose, an integrating saturable core transformer circuit, generally indicated at 40, is provided. It comprises a core 42 formed from rectangular hysteresis loop material. This material, well known to those skilled in the art, has a sharp cutoff point between conditions of saturation and unsaturation so that the impedance of the windings on the core can change almost instantaneously from a relatively high value to almost zero. The core 42 has inductively coupled thereto three input windings 44, 46 and 48 all connected in series and wound in the same manner, an auxiliary reset winding 49 controlled by a switch S1 (discussed in connection with FIG. 5) and an output winding 50. The voltage $E_{VI}$ appearing between leads 36 and 38 at the output of Hall generator 34 is applied through resistor 52 to input winding 44. In accordance with the induced voltage equation for an inductor, the amount of flux $\phi$ produced in the winding 44 and, hence, the core 42 over a period of time will be:

$$\phi \alpha \int E_{VI} \, dt \alpha \int VI \, dt \alpha W$$

where the factors $E_{VI}$, $V$, $I$ and $W$ are as identified above. Therefore, the amount of flux $\phi$ produced in core 42 is proportional to energy W expressed in watt-hours.

Now, due to the nature of the square-loop core 42 as described above, the core will saturate at a sharp point. This saturation will represent a fixed amount of energy in accordance with the foregoing equation. At this time, the winding 44 will lose practically all of its inductance and a large portion of the output voltage of the Hall generator $E_{VI}$ will appear across resistor 52. A PNP junction transistor 54 has its base connected to lead 38 through a biasing battery 56. The emitter of transistor 54 is connected to the junction of input windings 46 and 48 as shown; whereas the lower end of winding 48 is connected through battery 58 and resistor 60 to the collector of transistor 54.

With this arrangement, the transistor 54 is biased by battery 56 such that it is non-conducting when the greater portion of the voltage $E_{VI}$ appears across winding 44 with the core unsaturated. When, however, the core saturates and the inductance of winding 44 drops almost to zero, the voltage $E_{VI}$ appears across resistor 52. This voltage, although constantly varying in magnitude, will be substantially of one polarity as indicated by the polarity markings across resistor 52. It can be seen, therefore, that the voltage across resistor 52 opposes that produced by battery 56 with the result that when the core 42 saturates and the inductance of the winding 44 drops, the increased voltage across resistor 52 will cause transistor 54 to conduct. This causes an emitter-to-collector current through transistor 54, and, hence, current through winding 48 with the polarity shown which tends to unsaturate the core 42. The flow of current through winding 48 also produces a current through winding 46 to produce a voltage which tends to keep the transistor 54 conducting regardless of a fall in voltage across resistor 52. Thus, current will flow through winding 48 until the core is completely unsaturated or until the core is saturated in the opposite direction. This current flow and resulting flux in the core 42 induces a pulse in winding 50 in the forward direction of a diode 62 such that a pulse will be applied to pulse counter 64. As will be understood, the diode 62 is necessary in order that pulses will be counted by counter 64 only during the time that the core 42 is reset. If, however, the pulse counter 64 is such that it will count only forward pulses, the diode 62 becomes unnecessary.

From the foregoing description, it will be understood that the fore 42 will saturate each time a given amount of flux is produced therein; and since this flux is proportional to a given amount of energy in acordance with the equations given above, the number of pulses counted by the pulse counter 64 will be equal to the number of incremental units energy delivered through the alternating current circuit connected to conductors 10 and 12. It should be noted that the arrangement of FIG. 1 will also operate if a magnetic field of the Hall generator is such that it is proportional to the voltage V and the load current I passes through the plate 26 rather than vice-versa. Furthermore, it should be pointed out that the resistor 52 introduces an error which is constant for all magnitudes of the voltage $E_{IV}$ and is akin to creep in the conventional watt-hour meter. This can be kept to a minimum by using the proper square-loop core material with the minimum value of coercive force and by keeping the value of resistor 52 to a minimum but still large enough to give positive reset action. Calibration of the device can be effected by varying the value of resistor 52. It will also be understood that the meter of FIG. 1 can be used equally well for direct current circuits.

Figure 2:
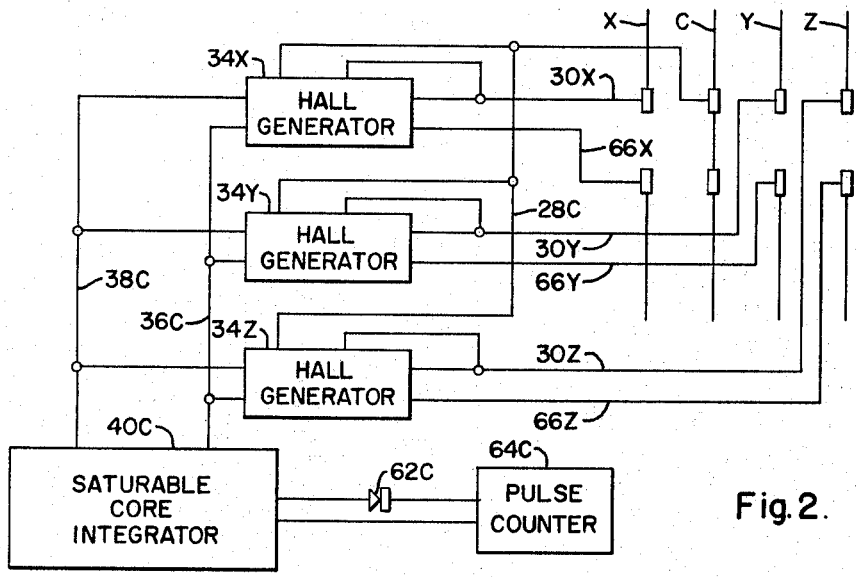
FIG. 2 is a schematic block diagram of the static watt-hour meter of the invention as applied to a three-phase alternating current circuit, the circuit of FIG. 2 employing the same basic circuit elements as that of FIG. 1.

Referring now to FIG. 2, the static watt-hour meter of FIG. 1 is shown as applied to a polyphase system. In the particular embodiment shown in FIG. 2, a three phase system is shown having phase conductors X, Y and Z together with a neutral conductor C. Three Hall generators 34X, 34Y and 34Z are shown one for each phase. The voltage, to neutral of phase X is applied across the Hall plate of generator 34X through common lead 28C and lead 30X; that of phase Y to neutral is applied to the Hall plate of generator 34Y through common lead 28C and lead 30Y; and that of phase Z to neutral is applied to the Hall plate of generator 34Z through common lead 28Z and lead 30Z. In a somewhat similar manner, the current of conductor X is applied to the winding 14 of generator 34X through leads 30X and 66X; that of conductor Y to generator 34Y through leads 30Y and 66Y; and that of conductor Z to generator 34Z through leads 30Z and 66Z.

The outputs of the Hall generators 34X, 34Y and 34Z are applied to common leads 36C and 38C which are connected to a saturable core integrator 40C in the same manner as are leads 36 and 38 in FIG. 1. With this arrangement, circuit 40C acts to integrate the function of the product of volts times amperes with respect to time for each of the phases and produces an output pulse applied to pulse counter 64C through diode 62C each time a fixed amount of energy flows through the three-phase circuit. Thus, by counting the pulses in pulse counter 64C the total energy, expressed in watt-hours, is derived.

As an alternative to the single-integrator arrangement shown in FIG. 2, any possible interference between integrating the function of volts times amperes with respect to time for each phase X, Y and Z can be eliminated by providing separate saturable core integrators for each phase and feeding the ouputs of these integrators into a common pulse counter for totalizing.

Figure 3:
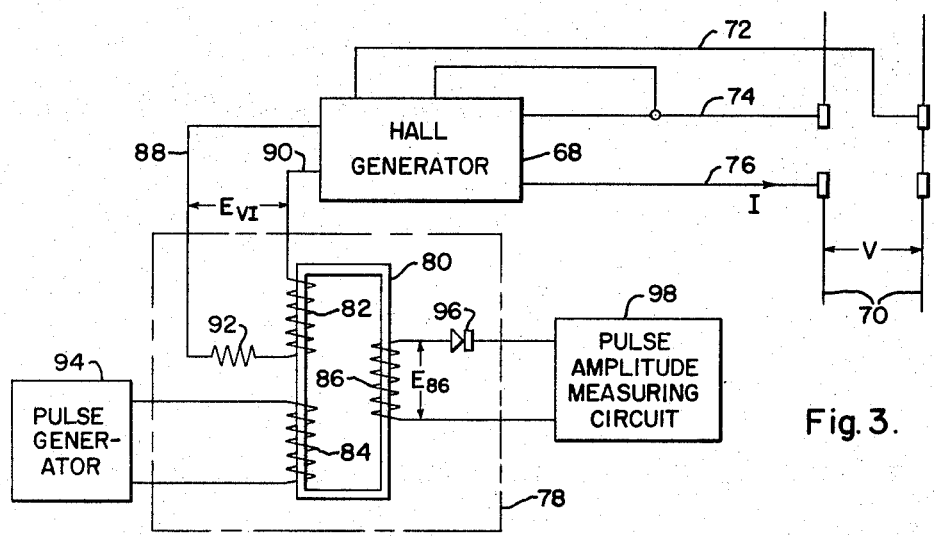
FIG. 3 is a block and schematic circuit diagram of the demand meter of the invention.

With reference now to FIG. 3, a demand meter is shown which again includes a Hall generator 68 similar to the Hall generator 34 shown in FIG. 1. The voltage V of an alternating current circuit 70 is applied to the Hall generator through leads 72 and 74; whereas the current of circuit 70 is applied to a winding on a laminated core of the generator 68 through leads 74 and 76 in the same manner as in FIG. 1. In this case, however, the saturable core integrator 40 is replaced by circuit 78 comprising a saturable core 80 having two input windings 82 and 84 thereon and a single output winding 86. The output of Hall generator 68, being a voltage $E_{VI}$ proportional to the function of the product of voltage and current of circuit 70, is applied through leads 88 and 90 and resistor 92 to input winding 82 on core 80. The other input winding 84 is connected to pulse generator 94 which produces output pulses of a fixed frequency. Output pulses of one polarity appearing across output winding 86 are applied through diode 96 to a pulse amplitude measuring circuit 98 adapted to produce an output signal indicative of the magnitude of the pulses applied thereto.

As is well known, a demand meter measures the wattage delivered through an alternating current circuit over a period of time, such as 15 or 30 minutes. If we let this time interval be T, the flux $\phi$ induced in core 80 by input winding 82 over this time interval will be:

$$\phi \alpha \int_0^T E_{VI} dt \alpha \int_0^T VI dt$$

The proportions should be such that this flux does not saturate the core 80. The resetting pulses from pulse generator 94 are such as to bring the core down to a negative saturation, once during each time interval T. In doing this, the resetting pulse can only produce a flux content in the core equal to the amout of flux build up in the core between resetting pulses. If we let $\phi_C$ equal the amount of flux built up in the core between resetting pulses and $\phi_R$ equal the resetting flux, then $\phi_C$ must equal $\phi_R$. Furthermore, if we let the voltage induced in winding 86 in the forward direction by $\phi_R$ be equal to $E_{86}$, then:

$$\phi_R = \int E_{86} dt_R$$

or $$E_{86} = d\phi_R / dt_R$$

where $dt_R$ is the time of resetting. By making this time of resetting, $dt_R$, sufficiently small and constant for all resetting periods, the value of $E_{86}$ will be proportional to $\phi_R$. A constant resetting period is provided, of course, by making the pulses in the output of pulse generator 94 all of the same pulse width. By feeding this value of $E_{86}$ to the pulse amplitude measuring circuit 98, the demand can be measured for the time interval T between resetting pulses. Depending upon the pulse amplitude measuring circuit 98, the maximum demand can be measured over a long period of time. For example, the measuring circuit 98 may take the form of a recorder for recording the measured pulse amplitude values on a chart.

Figure 4:
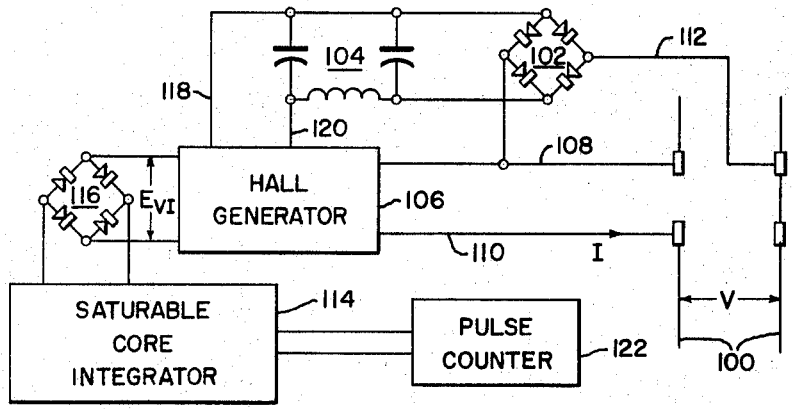
FIG. 4 is a block and schematic circuit diagram of the static volt-ampere-hour meter of the invention.

With reference now to FIG. 4, a volt-ampere-hour meter is shown which is essentially the same as the watt-hour meter shown in FIG. 1, except that the voltage V of an alternating current circuit 100 is initially rectified in full-wave rectifier 102 and passed through filter circuit 104 before being applied across the Hall plate in a Hall generator 106. The current I is, as in the watt-hour meter of FIG. 1, applied directly to a winding on a laminated core for the Hall generator 106 through leads 108 and 110. Lead 108, in combination with lead 112, serves to apply the voltage V of circuit 100 across the full-wave rectifier 102.

The output of Hall generator 106, instead of being applied directly to a saturable core integrator 114, similar to integrator 40 of FIG. 1, is initially rectified in a second full-wave rectifier 116. The purpose of rectifier 116 is to rectify the voltage $E_{VI}$ at the output of Hall generator 106 so that the saturable core integrator 114 will integrate over the entire cycle without respect to sign. Otherwise, the summation over the whole cycle will be zero.

By rectifying the line voltage V in rectifier 102 and by filtering it in filter 104, a steady direct current voltage is applied to the Hall generator 106 proportional to the peak or RMS value of line voltage V. This causes a current to flow through leads 118 and 120 and through the Hall plate of generator 106 proportional to $V_{RMS}$ on the peak value of line voltage V. Thus, in accordance with the explanation of the Hall generator 106 given above, the voltage $E_{VI}$ at the output of the generator 106 will be proportional to the product of line current I and $V_{RMS}$. By the same reasoning explained above in connection with the watt-hour meter of FIG. 1, the saturable core integrator 114 integrates this product with respect to time and the pulse counter 122 at the output of integrator 114 counts fixed amounts of the product $I \times V_{RMS}$.

Thus, the core measures:

$$\int V_{RMS} I dt$$

or $$\int V_{RMS} I_m \sin wt dt$$

for a sine wave where $I_m$ is the maximum or peak value of the current wave. As is well known, a volt-ampere-hour meter should measure $\int V_{RMS} I_{RMS} dt$. Since, however, $I_{RMS}$ is proportional to $I_m \sin wt$ for a sine wave, what the meter measures is proportional to $\int V_{RMS} I_{RMS} dt$.

It should be apparent that the output $E_{VI}$ of the Hall generator 106 can be rectified with only one diode instead of the four diodes in bridge rectifier 116, producing one-half wave rectification. This can be calibrated into the core of integrator 114 giving the desired result with a slight error due to the inverse leakage current of the diode.

Figure 5:
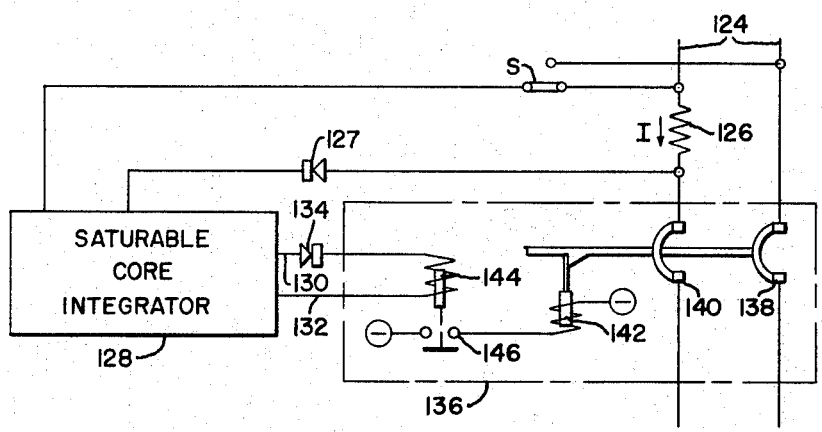
FIG. 5 is a schematic circuit diagram of the inverse time overcurrent relay of the invention.

With reference now to FIG. 5, an inverse-time over-current relay is shown which is set to trip in a time inversely proportional to the current over a predetermined safe value of current. That is, the time, T, to which the relay is set is:

$$T = I_P / K + I$$

where $I_P$ is a predetermined safe value of current, K equals a constant and I equals actual current through an alternating current circuit.

As shown in FIG. 5, the current I of an alternating current circuit 124 is passed through a resistor 126 causing a voltage drop $IR_{126}$. This voltage is rectified by diode 127 and applied to a saturable core integrator 128 similar to the integrator 40 described in connection with FIG. 1. As was explained in connection with the watt-hour meter of FIG. 1, the integrator 128 will integrate the factor $\int IR_{126} dt$ up to saturation. That is, the flux induced in the saturable core of the integrator 128, $\phi_{128}$, is approximately equal to $\int IR_{126} dt$. When the core of integrator 128 becomes saturated, the total voltage $IR_{126}$ will appear across a resistor in integrator 128 corresponding to resistor 52 in FIG. 1, thereby causing the resetting transistor in integrator 128, similar to transistor 54 of FIG. 1, to become conducting with current flowing through a winding corresponding to winding 48 of FIG. 1 until the core becomes completely unsaturated or saturated in the opposite direction. This produces a pulse at the output leads 130 and 132 of the integrator 128 in the forward direction of diode 134, the pulse being applied to a circuit breaker, enclosed by broken lines and identified by the numeral 136. As shown, the circuit breaker 136 includes contacts 138 and 140 in the circuit 124 which are held in closed position by means of a trip coil 142. The trip coil 142 is energized to trip the circuit breaker 136 and open contacts 138 and 140 upon energization of relay 144 to close its normally open contacts 146. The relay 144, in turn, is energized or tripped by a pulse across output leads 130 and 132 of integrator 128 in the forward direction of diode 134.

The resistor in saturable core integrator 128, corresponding to resistor 52 of FIG. 1, is adjusted to determine the value of $IR_{126}$ above which the core starts integrating. That is, $IR_{126}$ must be of such a value as to cause current to flow of sufficient value to drive the square-loop core to saturation. Below this value, the core will not saturate. Thus, the value of the resistor in circuit 128 corresponding to resistor 52 in FIG. 1 determines the value of line current I at which the relay or circuit breaker 136 will trip. The time to trip is thus inversely proportional to the value of line current, I, above a predetermined safe value of line current.

As will be understood, the basic system shown in FIG. 5 can be modified in various respects. For example, the diode 127 could be replaced by a full-wave rectifier bridge. Furthermore, a timed pulse could be sent through a timed switch and an auxiliary winding (corresponding to the switch S1 and the winding 49 of FIG. 1) on the saturable core of integrator 128 every so often to erase any accumulation of $\int IR_{126}dt$ above the safe set value of line current which in itself is not enough to cause tripping, but which the core has a tendency to remember and accumulate. A steady voltage applied to the auxiliary winding on the core of the integrator 128 in the resetting direction will also accomplish this. The ampere turns of the winding corresponding to the input winding 44 of FIG. 1 are designed to exceed those of the auxiliary winding when the line current is in the tripping range.

Figure 6:
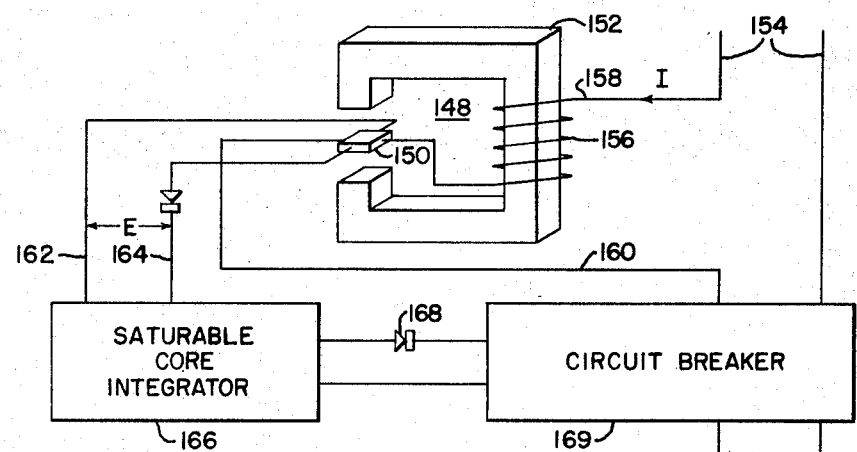
FIG. 6 is a schematic circuit diagram of the very inverse overcurrent relay of the invention.

In FIG. 6 a very-inverse overcurrent relay is shown which is set to trip in a time inversely proportional to the square of the current over a predetermined square value. That is, the time, T, at which the relay is set to trip is:

$$T = I_P/K + I^2$$

As shown in FIG. 6, the circuit includes a Hall generator 148 including a Hall plate 150 and a laminated magnetically permeable core 152 having the plate 150 disposed in an air gap provided therein. The line current I of an alternating current circuit 154 is applied both through a winding 156 on the core 152 as well as transversely through the Hall plate 150 via leads 158 and 160. Thus, in accordance with the explanation of the Hall generator given above, the voltage E across output leads 162 and 164 will be proportional to the instantaneous product of the current I through the Hall plate 150 and the flux through the core 152. Since, however, the flux through core 152 is proportional to I, the output voltage E is proportional to the square of line voltage (i.e., $I^2$). The voltage E, proportional to $I^2$, is fed to a saturable core integrator 166 similar to integrator 40 of FIG. 1. As in the inverse overcurrent relay of FIG. 5, the time to trip is inversely proportional to the voltage E and, hence, inversely proportional to $I^2$ above a safe predetermined value. The output of the saturable core integrator 166 is applied through diode 168 to a circuit breaker similar to the circuit breaker 136 of FIG. 5.

Figure 7:
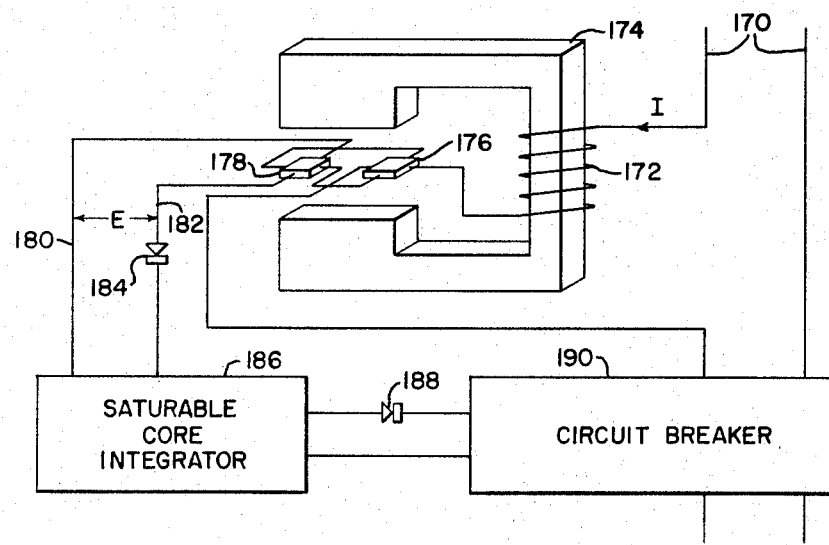
FIG. 7 is a schematic circuit diagram of the extremely inverse overcurrent relay of the invention.

With reference now to FIG. 7, an extremely inverse overcurrent relay is shown which is set to trip in a time inversely proportional to the cube of the line current I over a predetermined safe value of current. That is, the time, T, at which the relay is set to trip is:

$$T = I_P/K + I^3$$

In this case, the line current I from an alternating current circuit 170 is passed through a winding 172 on a laminated magnetically permeable core 174 having two Hall plates 176 and 178 disposed in its air gap. The line current I, in addition to passing through the winding 172, is also passed transversely through the one Hall plate 176. Hall plates 176 and 178 are connected in series as shown with the result that the voltage E appearing across output leads 180 and 182 is proportional to the cube of the line current I. This voltage is applied through diode 184 to a saturable core integrator 186 similar to the integrator 40 of FIG. 1. The result is that the voltage E across the second Hall plate 178 is proportional to $I^3$. The output voltage of the integrator 186 is then fed through diode 188 to a circuit breaker 190 with a tripping time inversely proportional to $I^3$ above the safe predetermined value.

Figure 8:
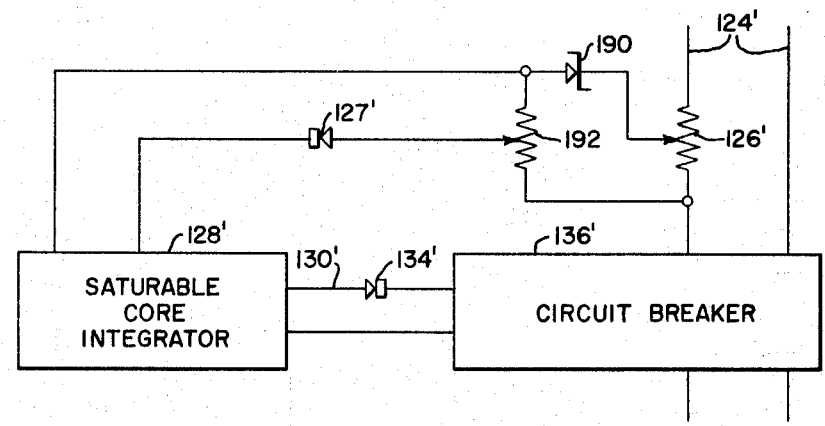
FIG. 8 is a schematic circuit diagram of an inverse time overcurrent relay capable of having the current at which it trips adjusted to suit varying conditions.

The tripping time of overcurrent relay of FIG. 5, for example, can be adjusted with the arrangement shown in FIG. 8. Elements of FIG. 8 which corresponds to those of FIG. 5 are identified by like, primed, reference numerals and are not hereinafter described in detail. The circuit of FIG. 8 is modified, however, to include a Zener diode 90 and an adjustable resistor 192. In addition, the resistor 126' through which the line current flows is made adjustable.

Figure 9:
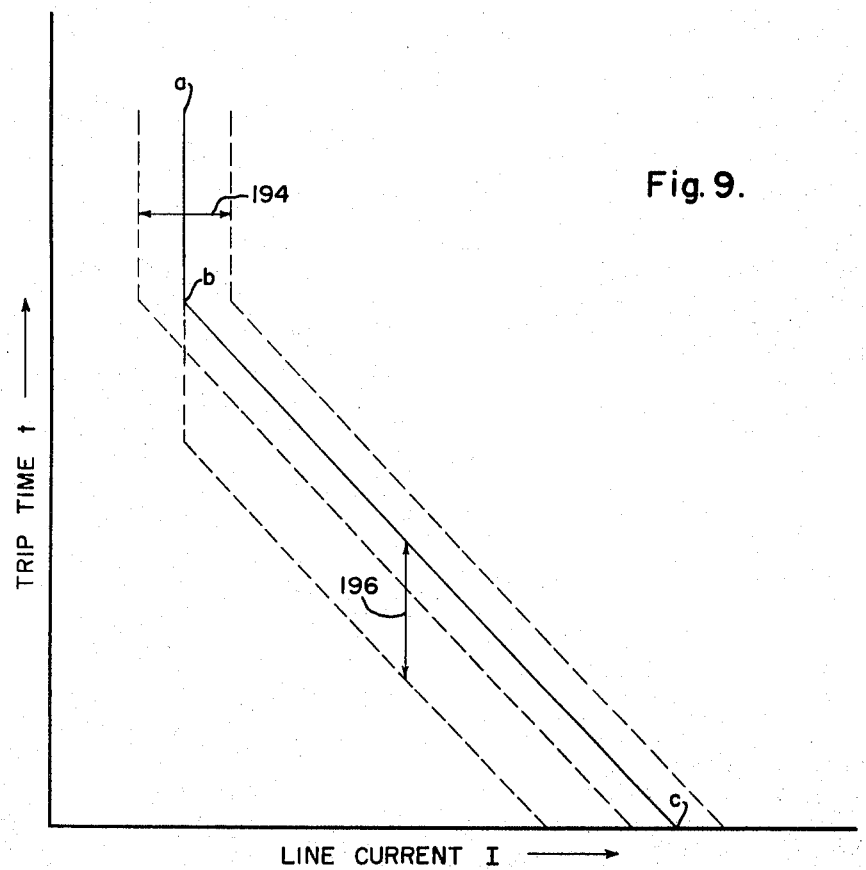
FIG. 9 is a graph illustrating the manner in which the circuit of FIG. 8 can be adjusted to change the current value as it trips a relay.

The tripping time versus line current for a relay system such as that shown in FIGS. 5 and 8 is plotted in FIG. 9. The curve abc shows that below a predetermined line current, the tripping time is infinite (i.e., the relay is not tripped). Above a specified value of line current determined by adjustment of a resistor in the saturable core integrator similar to resistor 52 in FIG. 1, however, the relay will trip in a time which decreases as the line current increases. The Zener diode 190 establishes the load current I below which the relay will not trip. By adjusting resistor 126', this minimum load current can be adjusted and the whole current-time shifted horizontally as indicated by the arrow 194 in FIG. 9. In a similar manner, by adjusting resistor 192, the whole curve abc can be shifted vertically as indicated by arrow 196 in FIG. 9. As mentioned above, adjustment of the resistor in saturable core integrator 128 corresponding to resistor 52 in FIG. 1 will alter the slope of the portion of the curve bc and effect the location of the portion ab and, hence, the current at which the relay will trip.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A static demand meter comprising a device responsive to the current and voltage of an alternating current circuit for producing a signal the voltage of which varies in proportion to the product of the voltage and current of said circuit, a saturable core transformer having input and output winding means thereon, means for applying said signal to said input winding means to drive the core to saturation in one direction, means for resetting said core at fixed time intervals, and pulse amplitude measuring means coupled to said output winding means for measuring the magnitude of pulses induced in the output winding means each time the core is reset.

2. A static demand meter comprising a device responsive to the current and voltage of an alternating current circuit for producing a signal the voltage of which varies in proportion to the product of the voltage and current of said alternating current circuit, a saturable core transformer having a plurality of input windings thereon, means for applying said signal to one of said input windings to drive the core to saturation in one direction, a pulse generator connected to another of said input windings and adapted to induce flux in said other input winding and to reset said core at fixed time intervals, an output winding for said saturable core transformer, and a pulse amplitude measuring circuit coupled to said output winding for measuring the magnitude of pulses induced in the output winding each time the core is reset.

3. A demand meter comprising a Hall generator, means for producing magnetic lines of flux through said generator and for passing a current through said generator in such directions as to produce a Hall voltage at output terminals on the generator proportional to the product of the electrical values representing the magnitudes of said lines of flux and current, means for causing one of said values to be proportional to the current of an alternating current circuit and the other value to be proportional to the voltage of said alternating current circuit, a saturable core transformer having input and output winding means thereon, circuit means coupled to said input winding means and to the output terminals of said Hall generator for driving said core to saturation in one direction, means for resetting said core at fixed time intervals, and pulse amplitude measuring apparatus coupled to said output winding means for measuring the magnitude of pulses induced in the output winding means each time the core is reset.

4. A static volt-ampere-hour meter comprising a Hall generator, means for producing magnetic lines of flux through said generator and for passing a current through said generator in such directions as to produce a Hall voltage at output terminals on the generator proportional to the product of the electrical values representing the magnitudes of said lines of flux and current, means for causing one of said values to be proportional to the current of an alternating current circuit and the other value to be proportional to the rectified voltage of said alternating current circuit, means for rectifying the Hall voltage appearing at the output terminals of said generator, a saturable core transformer having input and output windings thereon, means for applying the rectified output of said Hall generator to said input winding to cause the core to saturate in one direction, means for resetting said core each time it is saturated, and pulse counting apparatus coupled to said output winding for counting pulses induced in the output winding each time the core is reset.

5. An overcurrent relay set to trip in a time inversely proportional to the square of the current through a circuit over a predetermined safe value of current, comprising means for producing a voltage proportional to the square of the current flowing through said circuit, a saturable core transformer having input and output windings thereon, means for applying said voltage to said input winding to cause the core to saturate in one direction whenever the integral of the square of the current through said circuit with respect to time reaches a predetermined magnitude, means for resetting said core each time it is saturated, and a relay device coupled to said output winding and actuable when pulse is induced in the output winding as the core is reset.

6. An overcurrent relay set to trip in a time inversely proportional to the square of the current through a circuit over a predetermined safe value of current, comprising a Hall generator, means for producing magnetic lines of flux through said generator and for passing a current through said generator in such directions as to produce a Hall voltage at output terminals on the generator proportional to the product of the electrical values representing the magnitudes of said lines of flux and current, means for causing both of said values to be proportional to the current through said circuit such that the Hall voltage at said output terminals will be proportional to the square of the current flowing through said circuit, a saturable core transformer having input and output winding means thereon, means for connecting said input winding to the output terminals of said Hall generator, means for resetting said core each time it is saturated, and a relay device coupled to said output winding and actuable whenever a pulse is induced in the output winding when the core is reset.

7. An overcurrent relay set to trip in a time inversely proportional to the cube of the current through a circuit over a predetermined safe value of current, comprising means for producing a voltage proportional to the cube of the current flowing through said circuit, a saturable core transformer having input and output windings thereon, means for applying said voltage to said input winding to cause the core to saturate in one direction whenever the integral of the cube of the current through said circuit with respect to time exceeds a predetermined value, means for resetting said core each time it is saturated, and a relay device coupled to said output winding and actuable whenever a pulse is induced in said output winding as the core is reset.

8. The overcurrent relay of claim 7 wherein the means for producing a voltage proportional to the cube of the current flowing through said circuit comprises a pair of Hall plates, means for producing magnetic lines of flux through both of said plates, the lines of flux being proportional to the current through said circuit, means for passing said current through one of said Hall plates, and means for applying the Hall voltage appearing at output terminals of said one plate to input terminals on said other plate whereby a voltage will appear at the output terminals of said other plate proportional to the cube of the current flowing through said circuit.

References Cited

UNITED STATES PATENTS

| | | | |
|---|---|---|---|
| 2,550,492 | 4/1951 | Millar | 324—117 X |
| 2,824,697 | 2/1958 | Pittman | 307—88 X |
| 2,836,794 | 5/1958 | Davis | 324—117 |
| 2,849,662 | 8/1958 | Britten | 317—148 |

FOREIGN PATENTS

| | | |
|---|---|---|
| 1,020,414 | 12/1957 | Germany. |

RUDOLPH V. ROLINEC, *Primary Examiner.*

WALTER L. CARLSON, *Examiner.*

J. J. MULROONEY, *Assistant Examiner.*